(12) United States Patent
Kuroda et al.

(10) Patent No.: US 9,536,330 B2
(45) Date of Patent: Jan. 3, 2017

(54) PROGRAM INFORMATION GENERATION SYSTEM, METHOD FOR PROGRAM INFORMATION GENERATION, PROGRAM FOR PROGRAM INFORMATION GENERATION, AND PROGRAM INFORMATION DISPLAY SYSTEM FOR DISPLAYING THE EXECUTION STATUS OF A PROGRAM

(71) Applicant: Kabushiki Kaisha Toshiba, Minato-ku, Tokyo (JP)

(72) Inventors: Akira Kuroda, Yokohama Kanagawa (JP); Xinxiao Li, Yokohama Kanagawa (JP); Hidenori Matsuzaki, Tokyo (JP); Nobuaki Tojo, Tokyo (JP); Mayuko Koezuka, Tokyo (JP); Nobuyasu Nakajima, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 131 days.

(21) Appl. No.: 14/627,305

(22) Filed: Feb. 20, 2015

(65) Prior Publication Data
US 2015/0254879 A1 Sep. 10, 2015

(30) Foreign Application Priority Data
Mar. 4, 2014 (JP) .................................. 2014-041853

(51) Int. Cl.
*G06F 9/44* (2006.01)
*G06F 11/00* (2006.01)
(Continued)

(52) U.S. Cl.
CPC ......... *G06T 11/206* (2013.01); *G06F 11/3409* (2013.01); *G06F 11/3466* (2013.01)

(58) Field of Classification Search
CPC .. G06F 11/3409; G06F 11/3466; G06F 11/206
(Continued)

(56) References Cited

U.S. PATENT DOCUMENTS 5,872,909 A * 2/1999 Wilner ................ G06F 11/0715
714/38.12
6,332,212 B1 * 12/2001 Organ ................... G06F 11/323
714/E11.181
(Continued)

OTHER PUBLICATIONS

Wu et al., "Multithreaded Performance Analysis with Sun WorkShop™ Thread Event Analyzer," 1998, Sun Microsystems, Inc., p. 161.*

*Primary Examiner* — Qing Chen
(74) *Attorney, Agent, or Firm* — Knobbe, Martens, Olson & Bear, LLP

(57) ABSTRACT

A system according to an embodiment may include: a generation unit that acquires axis information in a coordinate system drawing execution status of a program, and generates an axis object representing the coordinate system based on the axis information; a display event information generation unit that acquires event information related to each of the two or more events and program structure information related to a section of the program generating the two or more events, and generates display event information related to one or more display events representing the two or more events; and an object generation unit that acquires the display event information and display event unit information indicating a display unit of the display event, and generates one or more event objects based on the display event information and the display event unit information.

11 Claims, 20 Drawing Sheets

(51) Int. Cl.
*G06T 11/20* (2006.01)
*G06F 11/34* (2006.01)

(58) Field of Classification Search
USPC .................... 717/124–135; 714/37, 38.1
See application file for complete search history.

(56) References Cited

U.S. PATENT DOCUMENTS

| | | | |
|---|---|---|---|
| 6,611,276 B1* | 8/2003 | Muratori | G06F 11/3664 714/E11.217 |
| 7,698,686 B2 | 4/2010 | Carroll et al. | |
| 2002/0156825 A1* | 10/2002 | Hoover, Jr. | G06F 11/323 718/105 |
| 2006/0248401 A1* | 11/2006 | Carroll | G06F 11/3423 714/38.1 |
| 2008/0209402 A1* | 8/2008 | Parkinson | G06F 11/3664 717/124 |
| 2009/0319996 A1* | 12/2009 | Shafi | G06F 8/314 717/125 |
| 2010/0223600 A1* | 9/2010 | Shafi | G06F 11/3636 717/131 |
| 2011/0099539 A1* | 4/2011 | Shafi | G06F 11/3636 717/128 |
| 2013/0218844 A1* | 8/2013 | Gooding | G06F 9/467 707/684 |
| 2013/0249917 A1* | 9/2013 | Fanning | G06T 11/206 345/440 |

* cited by examiner

FUNCTION(){
  //LOOP_A
  for(i=0; i<600; i++){
    if(i%2==0){
      //BLOCK_A
      TASK_A0;      }206  }204
      TASK_A1;      }207        }203
    }else{                              }202
      //BLOCK_B
      TASK_B;       }208  }205
    }
  }
  TASK_C();                     }209
}
```

FIG.3

| TIME | EXECUTION EVENT | | |
|---|---|---|---|
| 0-1 | TASK_A0 | ⎫ 301 | ⎫ |
| 1-9 | TASK_A1 | ⎭ | ⎬ 303 |
| 9-10 | TASK_B | } 302 | ⎭ |
| 10-11 | TASK_A0 | ⎫ 301 | ⎫ |
| 11-19 | TASK_A1 | ⎭ | ⎬ 303 |
| 19-20 | TASK_B | } 302 | ⎭ |
| ⋮ | ⋮ | ⋮ | ⋮ |
| 2990-2991 | TASK_A0 | ⎫ 301 | ⎫ |
| 2991-2999 | TASK_A1 | ⎭ | ⎬ 303 |
| 2999-3000 | TASK_B | } 302 | ⎭ |
| 3000-6000 | TASK_C | } 304 | |

FIG.7B

```
                                                    702
┌─────────────────────────────────────────────────────┐
│ PROGRAM STRUCTURE IDENTIFICATION INFORMATION: 1     │
│ PROGRAM HIERARCHY INFORMATION: LOOP_A               │
│ INCLUSIVE PROGRAM STRUCTURE IDENTIFICATION INFORMATION: 0 │
└─────────────────────────────────────────────────────┘
```

FIG.7C

```
                                                    703
┌─────────────────────────────────────────────────────┐
│ PROGRAM STRUCTURE IDENTIFICATION INFORMATION: 2     │
│ PROGRAM HIERARCHY INFORMATION: LOOP_A_ITERATION     │
│ INCLUSIVE PROGRAM STRUCTURE IDENTIFICATION INFORMATION: 1 │
└─────────────────────────────────────────────────────┘
```

FIG.7D

```
                                                    704
┌─────────────────────────────────────────────────────┐
│ PROGRAM STRUCTURE IDENTIFICATION INFORMATION: 3     │
│ PROGRAM HIERARCHY INFORMATION: BLOCK_A              │
│ INCLUSIVE PROGRAM STRUCTURE IDENTIFICATION INFORMATION: 2 │
└─────────────────────────────────────────────────────┘
```

FIG.7E

```
                                                    705
┌─────────────────────────────────────────────────────┐
│ PROGRAM STRUCTURE IDENTIFICATION INFORMATION: 4     │
│ PROGRAM HIERARCHY INFORMATION: TASK_A0              │
│ INCLUSIVE PROGRAM STRUCTURE IDENTIFICATION INFORMATION: 3 │
└─────────────────────────────────────────────────────┘
```

PROGRAM STRUCTURE IDENTIFICATION INFORMATION: 5
PROGRAM HIERARCHY INFORMATION: TASK_A1
INCLUSIVE PROGRAM STRUCTURE IDENTIFICATION INFORMATION: 3

PROGRAM STRUCTURE IDENTIFICATION INFORMATION: 6
PROGRAM HIERARCHY INFORMATION: BLOCK_B
INCLUSIVE PROGRAM STRUCTURE IDENTIFICATION INFORMATION: 2

PROGRAM STRUCTURE IDENTIFICATION INFORMATION: 7
PROGRAM HIERARCHY INFORMATION: TASK_B
INCLUSIVE PROGRAM STRUCTURE IDENTIFICATION INFORMATION: 6

PROGRAM STRUCTURE IDENTIFICATION INFORMATION: 8
PROGRAM HIERARCHY INFORMATION: TASK_C
INCLUSIVE PROGRAM STRUCTURE IDENTIFICATION INFORMATION: 0

EXECUTION STARTING INFORMATION: 0
EXECUTION ENDING INFORMATION: 1
PROGRAM STRUCTURE IDENTIFICATION INFORMATION: 4
ATTRIBUTE INFORMATION: BLOCK_A

EXECUTION STARTING INFORMATION: 1
EXECUTION ENDING INFORMATION: 9
PROGRAM STRUCTURE IDENTIFICATION INFORMATION: 5
ATTRIBUTE INFORMATION: BLOCK_A

EXECUTION STARTING INFORMATION: 9
EXECUTION ENDING INFORMATION: 10
PROGRAM STRUCTURE IDENTIFICATION INFORMATION: 7
ATTRIBUTE INFORMATION: BLOCK_B

EXECUTION STARTING INFORMATION: 3000
EXECUTION ENDING INFORMATION: 6000
PROGRAM STRUCTURE IDENTIFICATION INFORMATION: 8
ATTRIBUTE INFORMATION: TASK_C

FIG.9A

```
                                              901
┌─────────────────────────────────────────────┐
│ MINIMUM DRAWING SECTION UNIT: 100           │
│ TIME AXIS DRAWING RANGE: 0-5000             │
└─────────────────────────────────────────────┘
```

FIG.9B

```
                                              902
┌─────────────────────────────────────────────┐
│ ATTRIBUTE AXIS NAME: BLOCK_A                │
│ DISPLAY POSITION: 100                       │
└─────────────────────────────────────────────┘
```

FIG.9C

```
                                              903
┌─────────────────────────────────────────────┐
│ ATTRIBUTE AXIS NAME: BLOCK_B                │
│ DISPLAY POSITION: 200                       │
└─────────────────────────────────────────────┘
```

FIG.9D

```
                                              904
┌─────────────────────────────────────────────┐
│ ATTRIBUTE AXIS NAME: TASK_C                 │
│ DISPLAY POSITION: 300                       │
└─────────────────────────────────────────────┘
```

EXECUTION STARTING INFORMATION: 0
EXECUTION ENDING INFORMATION: 3000
ATTRIBUTE INFORMATION: BLOCK_A
DENSITY INFORMATION: 0.9
PLURAL EVENT DISPLAY INFORMATION: TRUE
EVENT COUNT: 600

EXECUTION STARTING INFORMATION: 0
EXECUTION ENDING INFORMATION: 3000
ATTRIBUTE INFORMATION: BLOCK_B
DENSITY INFORMATION: 0.1
PLURAL EVENT DISPLAY INFORMATION: TRUE
EVENT COUNT: 300

EXECUTION STARTING INFORMATION: 3000
EXECUTION ENDING INFORMATION: 1
ATTRIBUTE INFORMATION: TASK_C
DENSITY INFORMATION: 1
PLURAL EVENT DISPLAY INFORMATION: FALSE
EVENT COUNT: 1

```
main(){

DATA A[9][9];

for(i=0;i<10; i++){         ⎫
        ACCESS(A[0][i]);        ⎬ 1502
    }                           ⎭
    for(i=0; i<5; i++){         ⎫
        ACCESS(A[1][i]);        ⎬ 1503
    }                           ⎭
}
```

DATA STRUCTURE IDENTIFICATION INFORMATION: A[][]
DATA HIERARCHY INFORMATION: A[][]
INCLUSIVE DATA STRUCTURE IDENTIFICATION INFORMATION: NONE

DATA STRUCTURE IDENTIFICATION INFORMATION: A[0][]
DATA HIERARCHY INFORMATION: A[0][]
INCLUSIVE DATA STRUCTURE IDENTIFICATION INFORMATION: A[][]

DATA STRUCTURE IDENTIFICATION INFORMATION: A[1][]
DATA HIERARCHY INFORMATION: A[1][]
INCLUSIVE DATA STRUCTURE IDENTIFICATION INFORMATION: A[][]

DATA STRUCTURE IDENTIFICATION INFORMATION: A[0][0]
DATA HIERARCHY INFORMATION: A[0][0]
INCLUSIVE DATA STRUCTURE IDENTIFICATION INFORMATION: A[0][]

⋮

1820

DATA STRUCTURE IDENTIFICATION INFORMATION: A[0][9]
DATA HIERARCHY INFORMATION: A[0][9]
INCLUSIVE DATA STRUCTURE IDENTIFICATION INFORMATION: A[0][]

DATA STRUCTURE IDENTIFICATION INFORMATION: A[1][0]
DATA HIERARCHY INFORMATION: A[1][0]
INCLUSIVE DATA STRUCTURE IDENTIFICATION INFORMATION: A[1][]

⋮

1830

DATA STRUCTURE IDENTIFICATION INFORMATION: A[1][9]
DATA HIERARCHY INFORMATION: A[1][9]
INCLUSIVE DATA STRUCTURE IDENTIFICATION INFORMATION: A[1][]

FIG.19A

1901
STARTING POINT MEMORY ADDRESS INFORMATION: 0x00000000
ENDING POINT MEMORY ADDRESS INFORMATION: 0x0000FFFF
DATA STRUCTURE IDENTIFICATION INFORMATION: A[0][0]
ACCESS COUNT: 1

⋮

1910
STARTING POINT MEMORY ADDRESS INFORMATION: 0x0009FFFF
ENDING POINT MEMORY ADDRESS INFORMATION: 0x000AFFFF
DATA STRUCTURE IDENTIFICATION INFORMATION: A[0][9]
ACCESS COUNT: 1

FIG.19B

1911
STARTING POINT MEMORY ADDRESS INFORMATION: 0x00F00000
ENDING POINT MEMORY ADDRESS INFORMATION: 0x00F0FFFF
DATA STRUCTURE IDENTIFICATION INFORMATION: A[1][0]
ACCESS COUNT: 1

⋮

1915
STARTING POINT MEMORY ADDRESS INFORMATION: 0x00F9FFFF
ENDING POINT MEMORY ADDRESS INFORMATION: 0x00FAFFFF
DATA STRUCTURE IDENTIFICATION INFORMATION: A[1][4]
ACCESS COUNT: 1

STARTING POINT MEMORY ADDRESS INFORMATION: 0x00000000
ENDING POINT MEMORY ADDRESS INFORMATION: 0x000AFFFF
ATTRIBUTE INFORMATION: A[0][]
DENSITY INFORMATION: 1.0
PLURAL ACCESS DISPLAY INFORMATION: TRUE
ELEMENT COUNT: 10

STARTING POINT MEMORY ADDRESS INFORMATION: 0x00F00000
ENDING POINT MEMORY ADDRESS INFORMATION: 0x00FAFFFF
ATTRIBUTE INFORMATION: A[1][]
DENSITY INFORMATION: 0.5
PLURAL ACCESS DISPLAY INFORMATION: TRUE
ELEMENT COUNT: 5

PROGRAM INFORMATION GENERATION SYSTEM, METHOD FOR PROGRAM INFORMATION GENERATION, PROGRAM FOR PROGRAM INFORMATION GENERATION, AND PROGRAM INFORMATION DISPLAY SYSTEM FOR DISPLAYING THE EXECUTION STATUS OF A PROGRAM

CROSS-REFERENCE TO RELATED APPLICATIONS

This application is based upon and claims the benefit of priority from Japanese Patent Application No. 2014-041853, filed on Mar. 4, 2014; the entire contents of which are incorporated herein by reference.

FIELD

Embodiments described herein relate generally to a program information generation system, a method for program information generation, a program for program information generation, and a program information display system.

BACKGROUND

Conventionally, there has been a technique related to program information display for supporting program analysis by a user by which to display thread objects indicative of a thread and events in a program executed according to an execution trace of the program, in a coordinate system with a time axis and the thread as axis elements. According to this technique, with a region for displaying activities of the program in all execution status and a region for displaying detailed execution status within a specific range by the use of the thread axis and the time axis, the user is provided with the function of specifying the specific range from the region for displaying all the execution status to display interactively detailed information at specific points from all the execution status of the program.

On development of a program by a program developer, in the case of displaying the execution status of the program for confirmation of operations, performance optimization, and the like, a conventional program information display device would display the execution status of the program thereon, and thus the display region is limited to the size of the display device. Accordingly, when a large number of events needs to be displayed in a region for displaying the detailed execution status of the program, it may be difficult for the program developer to comprehend the detailed execution status of the program in such cases where information on all the events cannot be displayed due to the limited display size of the display device, or the information on all the events can be displayed but objects indicative of the events are represented in an extremely small size or cannot be represented due to the limited drawing performance of the display device, for example.

BRIEF DESCRIPTION OF THE DRAWINGS

FIG. 2 is a diagram illustrating a program exemplified in the first embodiment; and FIG. 3 is a diagram illustrating execution status of the program illustrated in FIG. 2;

FIG. 7B is a diagram illustrating an example of program structure information according to the first embodiment (second);

FIG. 7C is a diagram illustrating an example of program structure information according to the first embodiment (third);

FIG. 7D is a diagram illustrating an example of program structure information according to the first embodiment (fourth);

FIG. 7E is a diagram illustrating an example of program structure information according to the first embodiment (fifth);

FIG. 7F is a diagram illustrating an example of program structure information according to the first embodiment (sixth);

FIG. 7G is a diagram illustrating an example of program structure information according to the first embodiment (seventh);

FIG. 7H is a diagram illustrating an example of program structure information according to the first embodiment (eighth);

FIG. 7I is a diagram illustrating an example of program structure information according to the first embodiment (ninth);

FIG. 8A is a diagram illustrating an example of event information according to the first embodiment (first);

FIG. 8B is a diagram illustrating an example of event information according to the first embodiment (second);

FIG. 8C is a diagram illustrating an example of event information according to the first embodiment (third);

FIG. 8D is a diagram illustrating an example of event information according to the first embodiment (fourth);

FIG. 9A is a diagram illustrating an example of axis information according to the first embodiment (first);

FIG. 9B is a diagram illustrating an example of axis information according to the first embodiment (second);

FIG. 9C is a diagram illustrating an example of axis information according to the first embodiment (third);

FIG. 9D is a diagram illustrating an example of axis information according to the first embodiment (fourth);

FIG. 12A is a diagram illustrating an example of display event information according to the first embodiment (first);

FIG. 12B is a diagram illustrating an example of display event information according to the first embodiment (second);

FIG. 12C is a diagram illustrating an example of display event information according to the first embodiment (third);

FIG. 15 is a diagram illustrating an example of a program executed by a program information generation device (system) according to a second embodiment;

FIG. 18A is a diagram illustrating an example of data structure information according to the second embodiment (first);

FIG. 18B is a diagram illustrating an example of data structure information according to the second embodiment (second);

FIG. 18C is a diagram illustrating an example of data structure information according to the second embodiment (third);

FIG. 18D is a diagram illustrating examples of data structure information according to the second embodiment (fourth);

FIG. 18E is a diagram illustrating examples of data structure information according to the second embodiment (fifth);

FIG. 19A is a diagram illustrating examples of access information according to the second embodiment (first);

FIG. 19B is a diagram illustrating examples of access information according to the second embodiment (second);

FIG. 23A is a diagram illustrating an example of display access information according to the second embodiment (first);

FIG. 23B is a diagram illustrating an example of display access information according to the second embodiment (second);

DETAILED DESCRIPTION

Program information generation systems, methods for program information generation, programs, and program information display systems according to embodiments exemplified herein will be described below in detail with reference to the attached drawings.

First Embodiment

First, a program information generation system, a method for program information generation, a program for program information generation, and a program information display system according to a first embodiment will be described in detail with reference to the drawings.

Figure 1:
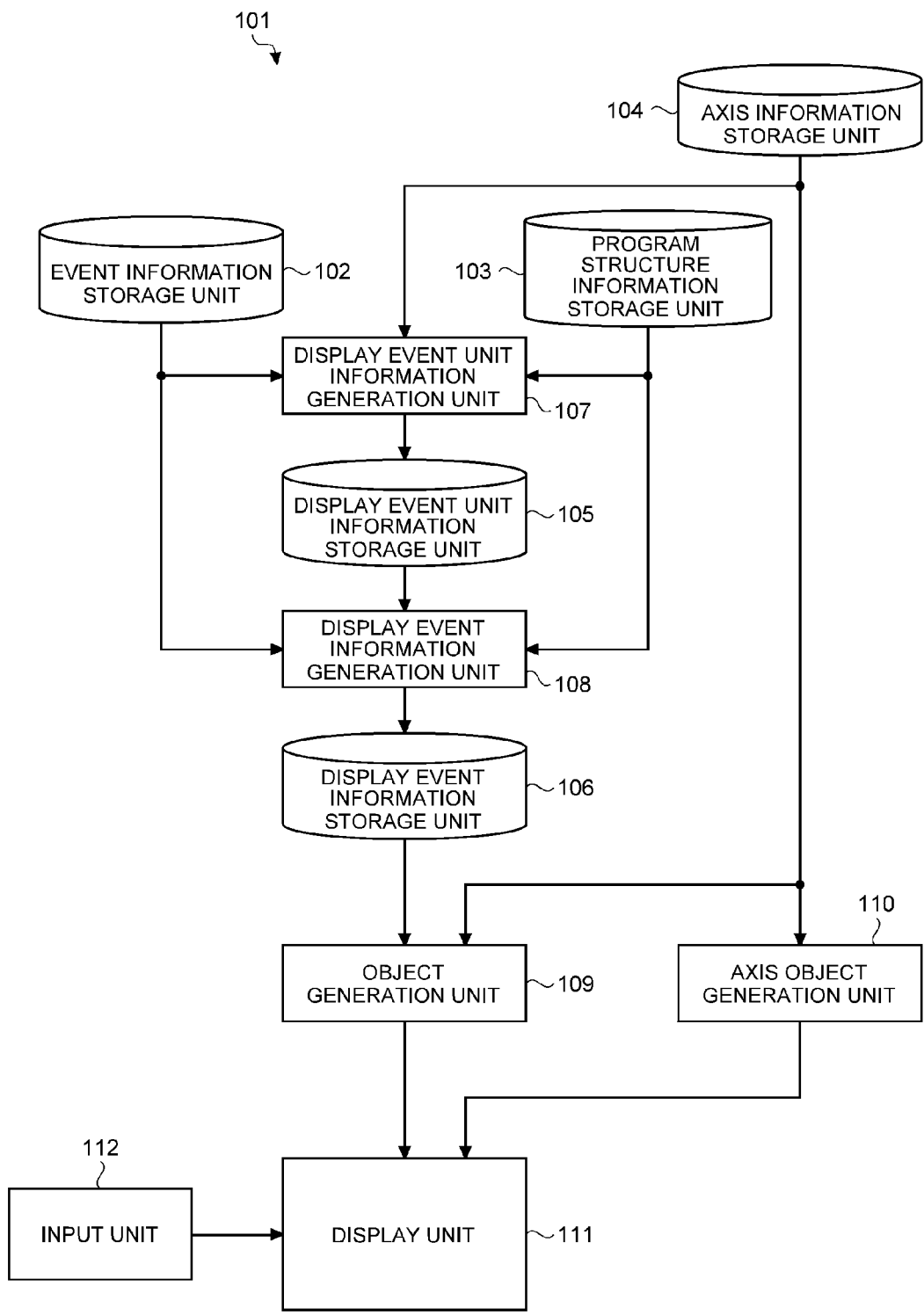
FIG. 1 is a block diagram illustrating a schematic configuration example of a program information display device (system) according to a first embodiment.

FIG. 1 is a block diagram illustrating a schematic configuration example of a program information display device (system) according to the first embodiment. A program information display device (system) 101 includes an event information storage unit 102, a program structure information storage unit 103, an axis information storage unit 104, a display event unit information storage unit 105, a display event information storage unit 106, a display event unit information generation unit 107, a display event information generation unit 108, an object generation unit 109, an axis object generation unit 110, a display unit 111, and an input unit 112.

In the embodiment, a program refers to a description of instructions to be issued to a computer in a specific language or form, and an event refers to a unit of processing generated during execution of a program or a process. The event may be a constituent unit of a program such as a function, loop, conditional branching, or the like, or may be a specific process such as memory access, instruction execution, thread generation, synchronization process, or the like, for example.

Hereinafter, a display example of execution status during execution of a program illustrated in FIG. 2 will be described. As illustrated in FIG. 2, a program 201 is configured to execute a loop "LOOP_A" 203 as a repetitive process and a task "TASK_C" 209 within a function "FUNCTION" 202. The "LOOP_A" 203 is composed of blocks "BLOCK_A" 204 and "BLOCK_B" 205 and configured to execute either of the blocks according to a result of conditional branching. The "BLOCK_A" 204 is composed of tasks "TASK_A0" 206 and "TASK_A1" 207, and the"BLOCK_B" 205 is composed of a task "TASK_B"208.

Execution status of the program 201 as described above is obtained by executing the loop "LOOP_A" 303 including the events "TASK_A0" and "TASK_A1" 301, and the event "TASK_B" 302 600 times and then executing the event "TASK_C" 304 once, as illustrated in FIG. 3.

In the embodiment, the program execution status illustrated in FIG. 3 is displayed in a plane or a space including a time axis. In the embodiment, the time axis is an axis indicative of the event execution time.

Figure 4:
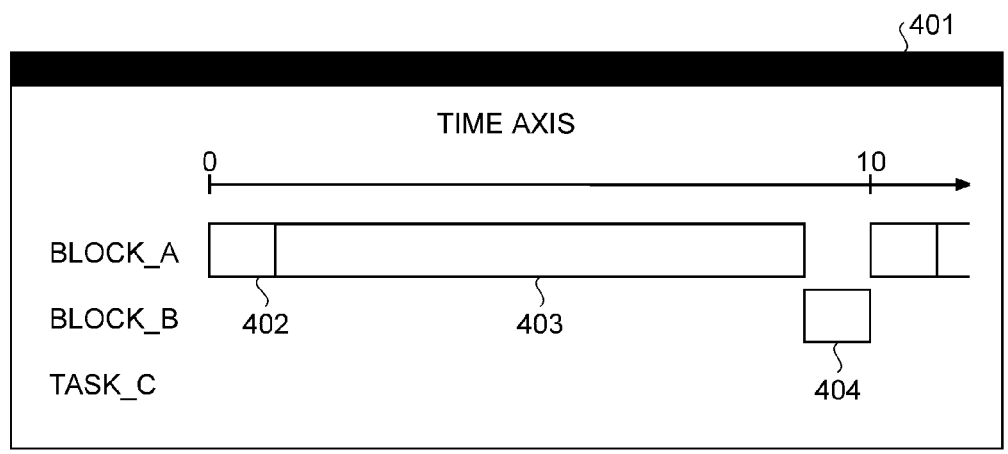
FIG. 4 is a diagram illustrating a display example of program execution status according to a conventional technique.
Figure 5:
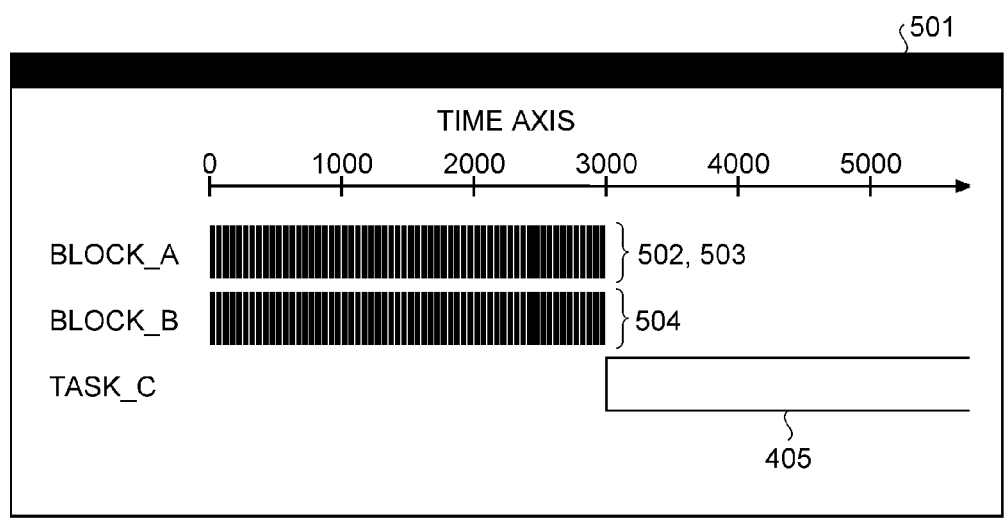
FIG. 5 is a diagram illustrating another display example of program execution status according to a conventional technique.

In general, there is a limitation on the display screen size or the display window size of the display device configured to display the program execution status. That is, there is a limitation on the number of elements that can be displayed at once on the time axis. FIGS. 4 and 5 illustrate display examples of the program execution status according to conventional techniques.

FIG. 4 illustrates an example in which the display sizes of the time axis elements are fixed. In this example, there is a limitation on the execution period that can be displayed at once (in FIG. 4, the execution period of "0" to "10"), and thus all the elements of the time axis may not be displayed at once. In such a case, the display range can be scrolled through by sliding a scroll bar or the like to view a range not displayed. However, the entire program execution status cannot be overviewed and it may be difficult for the user to comprehend the entire program execution status.

FIG. 5 illustrates an example in which all the elements of the time axis are displayed at once. In this example, according to the conventional technique, the display sizes of the time axis elements are decided by the display screen size or the display window size. Thus, a plurality of events may be displayed in sizes smaller than a minimum unit of drawing (for example, resolution) depending on drawing performance of the display device, and the events may not be distinguished one by one. In the example of FIG. 5, for example, it is difficult to distinguish among the execution times of the events "TASK_A0" 502 and "TASK_A1" 503 included in "BLOCK_A" and the event "TASK_B" 504 included in the "BLOCK_B."

Accordingly, in the embodiment, events incapable of being displayed due to the limited drawing performance are collectively displayed according to a hierarchy of a program structure, and information on the events incapable of being displayed due to the limited drawing performance is also displayed, thereby allowing the user to comprehend the entire program execution status even if the same is collectively displayed. In the embodiment, density information is used as information on the events incapable of being displayed due to the limited drawing performance. Details of the density information will be provided later.

Figure 6:
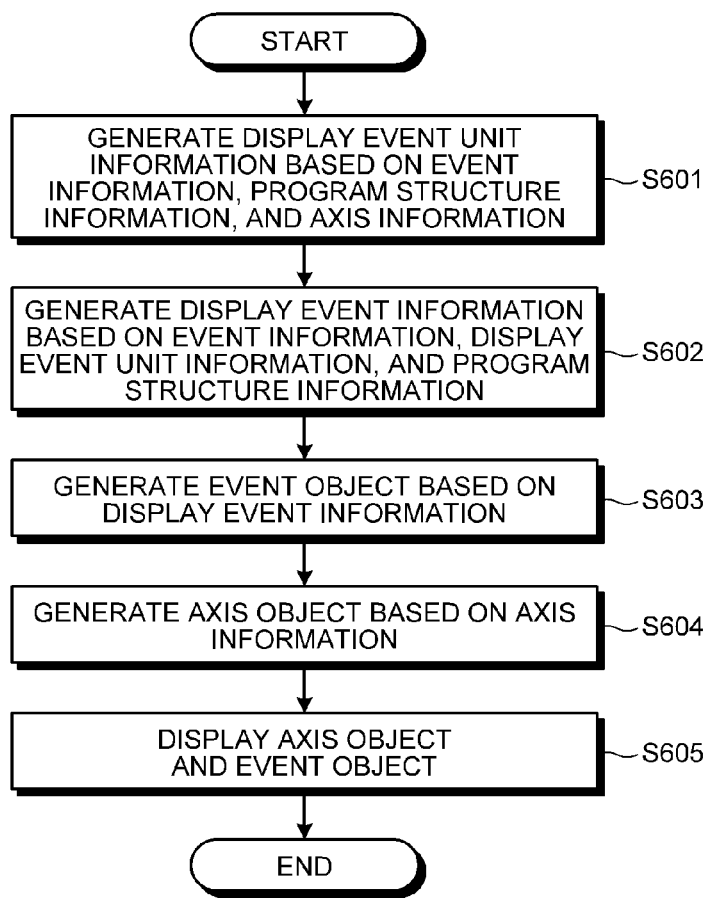
FIG. 6 is a flowchart of an overall operation example of displaying program execution status according to the first embodiment.
Figure 7A:
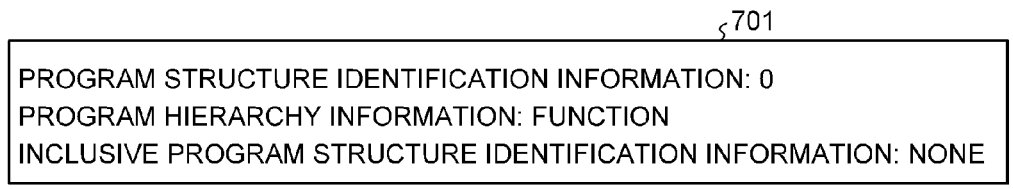
FIG. 7A is a diagram illustrating an example of program structure information according to the first embodiment (first)

Subsequently, an overall operation of the program information display device (system) according to the embodiment will be described in detail with reference to the drawings. FIG. 6 is a flowchart of an overall operation example of program information display according to the first embodiment. In the operation, as illustrated in FIG. 6, the display event unit information generation unit 107 first acquires inputs of event information from the event information storage unit 102, program structure information from the program structure information storage unit 103, and axis information from the axis information storage unit 104, and then generates display event unit information from the input event information, program structure information, and axis information (step S601). The generated display event unit information is stored in the display event unit information storage unit 105.

Next, the display event information generation unit 108 acquires inputs of event information from the event information storage unit 102, display event unit information from the display event unit information storage unit 105, and program structure information from the program structure information storage unit 103, and then generates display event information from the input event information, display event unit information, and program structure information (step S602). The generated display event information is stored in the display event information storage unit 106.

Next, the object generation unit 109 acquires display event information from the display event information storage unit 106, and generates an event object from the input display event information (step S603). The axis object generation unit 110 acquires axis information from the axis information storage unit, and generates an axis object from the input axis information (step S604).

When the event object and the axis object are generated as described above, the display unit 111 acquires the event object and the axis object, and displays program execution status using the input event object and axis object (step S605).

Next, detailed configurations and operations of components of the program information display device (system) according to the embodiment will be described below.

Program Structure Information Storage Unit

The program structure information storage unit 103 stores at least one piece of program structure information. The program structure information storage unit 103 may be a buffer, memory, storage, or the like incorporated into an information processing device such as a PC (personal computer), may be a storage or the like connected to the information processing device, or may be a network storage or the like on a network. The program structure information includes program structure identification information for identifying one piece of program structure information, program hierarchy information, and inclusive program structure identification information for specifying program structure information in an inclusive relationship.

In the embodiment, the inclusive program structure identification information is configured to identify, between first program structure information and second program structure information including the first program structure information, "adjacent" second inclusive program structure information not including third program structure information including the first program structure information.

FIGS. 7A to 7I illustrate examples of program structure information on the program 201 illustrated in FIG. 2. Program structure information 701 on "FUNCTION" illustrated in FIG. 7A has program structure identification information "0," program hierarchy information "FUNCTION," and inclusive program structure identification information "NONE," which forms a hierarchy indicating the entire range of the program 201 illustrated in FIG. 2. Therefore, the program structure information 701 has no inclusive program structure information. Program structure information 702 on "LOOP_A" illustrated in FIG. 7B has program structure identification information "1," program hierarchy information "LOOP_A," and inclusive program structure identification information "0," which forms a hierarchy indicating the range of "LOOP_A" 203 in the program 201 illustrated in FIG. 2. Therefore, the program structure information 702 is given the inclusive program structure identification information "0" indicating that the program structure information 702 is included in the program structure information 701 on "FUNCTION."

Similarly, other program structure information 703 to 709 in the program 201 are given identifiers "2" to "9," respectively, for unique identification as the program structure identification information, and are given character strings indicative of respective hierarchy information as the program hierarchy information, and are given program structure identification information for identifying respective inclusive program structure information as the inclusive structure identification information.

The program hierarchy information here is information indicating a specific hierarchy in the program. For example, the program hierarchy information may be information indicative of a file, function, loop, or conditional branching in the program, or may be information indicative of an aggregation of data structures such as an array or a structural body, or a subset of the aggregation. The program structure identification information is information for specifying one piece of program structure information from a plurality of pieces of program structure information stored in the program structure information storage unit. For example, the program structure identification information may be a proper name or ID of a program structure. The program structure identification information and the program hierarchy information can be united into either one.

The inclusive program structure identification information is information for specifying program structure information including a program structure. One piece of identification information corresponds to one piece of program structure identification information in program structure information in the program structure information storage unit 103. In the case where there is no inclusive program structure information, the inclusive program structure identification information may be information indicative of "no information," such as "NULL" or "NONE," for example. The number of the inclusive program structure identification information may be one or more. The inclusive program structure identification information may be information for identifying, between first program structure information and second program structure information including the first program structure information, "adjacent" second inclusive program structure information not including third program structure information including the first program structure information, or may be information for identifying, between the first program structure information and the second program structure information including the first program structure information, "not adjacent" second inclusive program structure information including the third program structure information including the first program structure information.

Event Information Storage Unit

The event information storage unit 102 stores at least two pieces of event information. The event information storage unit 102 may be a buffer, memory, storage, or the like that is incorporated into an information processing device such as a PC (personal computer), may be a storage or the like connected to the information processing device, or may be a network storage or the like on a network. The event information is information on an event executed during execution of a program, which includes section information, program structure identification information, and event attribute information.

In the embodiment, an event "TASK_A0" 206 with an execution time of one cycle, an event "TASK_A1" 207 with an execution time of eight cycles, an event "TASK_B" 208 with an execution time of one cycle are each executed repeatedly 300 times, and an event "TASK_C" 209 with an execution time of 3000 cycles is executed, and then program execution status is displayed.

FIGS. 8A to 8D illustrate examples of event information according to the embodiment. For example, event information 801 illustrated in FIG. 8A indicates the first execution of the event "TASK_A0" 206, with execution starting time "0," execution ending time "1," and program structure identification information "4," and attribute information "BLOCK_A." Event information 802 illustrated in FIG. 8B indicates the first execution of the event "TASK_A1" 207, with execution starting time "1," execution ending time "9," program structure identification information "5," and attribute information "BLOCK_A." Event information 803 illustrated in FIG. 8C indicates the first execution of the event "TASK_B" 208, with execution starting time "9," execution ending time "10," program structure identification information "7," and attribute information "BLOCK_B." Event information 804 illustrated in FIG. 8D indicates the first execution of the event "TASK_C" 209, with execution starting time "3000," execution ending time "6000," program structure identification information "8," and attribute information "TASK_B." However, the event information as described above is generated for all the events to be repeatedly executed by iteration.

The section information defines the execution starting time and execution period of an event. The section information may be composed of the execution starting time and the execution period, or may be composed of the execution starting time and the execution ending time, or may be composed of the execution period and the execution ending time, or may be composed of the execution starting time or the execution starting time of an event. The execution starting time, execution ending time, and execution period are time information. The foregoing information may be a processor time on execution of a program or may be time information generated based on the processor time.

The attribute information relates to an event. The attribute information may be execution trace information, or may be static information on a program, or may be information on program execution environment, for example.

The execution trace information indicates the execution status capable of being acquired during execution of the program. The execution trace information may be information on a processor core executing an event, may be information on an instruction for execution of the event, may be information on event execution period, may be information on memory access executed in the event, may be information on the number of function calls executed in the event, may be a value of a variable in the event, may be information on, in the case where the event is loop iterations, how many iterations have been performed, may be information on whether the event is an interruption, may be a data structure such as an array or a structure body, may be a memory address section in the data structure, may be a leading memory address in the data structure, or may be a termination end memory address in the data structure.

The static information on a program is static information obtained from a source code or a source code management system. This information may be a positional information on a source code, software program structure information, source code compile information, source code version information, information on whether the program is a kernel program, or information on whether the program is a user program, for example.

The program execution environmental information is information on the environment in which a program is executed. This information may be a processor core name, a server name, or server specification information, for example.

Axis Information Storage Unit

The axis information storage unit 104 stores axis information composed of time-series information, at least one or more pieces of attribute axis information, and at least one or more display attribute specification information. The axis information storage unit 104 may be a buffer, memory, storage, or the like that is incorporated into an information processing device such as a PC (personal computer), may be a storage or the like connected to the information processing device, or may be a network storage or the like on a network.

The axis information is composed of time axis information, attribute axis information, and display attribute specification information. The time axis information includes information indicative of a period represented by a minimum drawing unit of the display device and display range information indicative of a display range in a time axis direction. The attribute axis information indicates element names of the axis and element display positions, which correspond to the event attribute information of the event information.

FIGS. 9A to 9D illustrate examples of axis information according to the embodiment. According to the time axis information 901 illustrated in FIG. 9A, the minimum drawing unit is "100" and the display range information is "0 to 5000." This means that the minimum drawing unit is 100 cycles and the display range is 0 to 5000 cycles. Attribute axis information 902 of the "BLOCK_A" (refer to FIG. 9B), attribute axis information 903 of the "BLOCK_B" (refer to FIG. 9C), and attribute axis information 904 of the "TASK_C" (refer to FIG. 9D) indicate that the display position is 100, 200, and 300, respectively.

In the foregoing description, the time axis information indicates information represented by the minimum drawing unit of the display device. This information may be period information per display interval, display interval information per period, or information composed of the display interval and the period information indicated by the display interval, for example. The time axis information may be held in advance in the program information display device, may be specified by the software developer, or may be generated based on the screen size or window size of the display device and the execution time information to be displayed on one screen.

The attribute axis information includes the element names of the attribute axis and the display position information on the elements. As the element names of the attribute axis, there exists information corresponding to the event attribute information in the event information. Some of the element names of the attribute axis coincide with the event attribute information of the event information corresponding to the attribute axis. The element names of the attribute axis may be held in advance in the program information display device or may be specified by the software developer.

The display position information indicates the display positions of the element names of the attribute axis on the screen of the display device. The display position information may be held in advance in the program information display device, may be specified by the software developer, or may be generated based on the screen size or window size of the display device and the number of elements of the attribute axis to be displayed on one screen.

Display Event Unit Information Storage Unit

The display event unit information storage unit 105 stores at least one piece of program display unit information. The display event unit information storage unit 105 may be a buffer, memory, storage, or the like that is incorporated into an information processing device such as a PC (personal computer), may be a storage or the like connected to the information processing device, or may be a network storage or the like on a network.

The display event unit information defines the event display unit. The display event unit information is a program structure unit having a section equal to or larger than a section in the minimum drawing section unit information, and includes the program structure identification information related to one or more pieces of event information, for example. However, the display event unit information is not limited to this but may be information for specifying the program structure information, or may be program structure information.

Figure 10A:
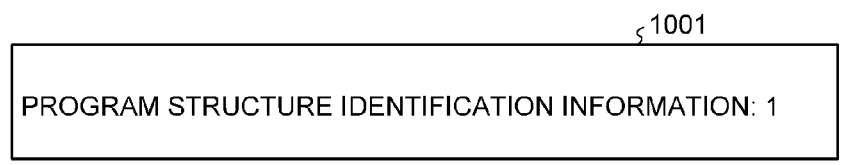
FIG. 10A is a diagram illustrating an example of display event unit information according to the first embodiment (first)
Figure 10B:
FIG. 10B is a diagram illustrating an example of display event unit information according to the first embodiment (second)

FIGS. 10A and 10B illustrate examples of display event unit information according to the embodiment. Display event unit information 1001 illustrated in FIG. 10A has program structure identification information "1." Display event unit information 1002 illustrated in FIG. 10B has program structure identification information "8."

Display Event Unit Information Generation Unit

The display event unit information generation unit 107 acquires the event information from the event information storage unit 102, program structure information from the program structure information storage unit 103, and axis information from the axis information storage unit 104, and then calculates section information on the program structure based on the input event information, program structure information, and axis information. Next, the display event unit information generation unit 107 specifies program structure information in which section information in one or more pieces of program structure information having the same adjacent inclusion program structure information indicates a section equal to or larger than a section indicated by the minimum drawing unit information represented by the time axis information in the axis information. Next, the display event unit information generation unit 107 selects, from one or more pieces of specified program structure information, program structure information composed of program structure information in the lowest layer, regardless of presence or absence of an inclusion relationship, and then generates program structure identification information on the program structure information as display event unit information.

The section information on the program structure only needs to be calculated based on the section information in the event information on the same program structure, and may be a maximum value of the section information, a minimum value of the same, or an average value of the same, for example.

Figure 11:
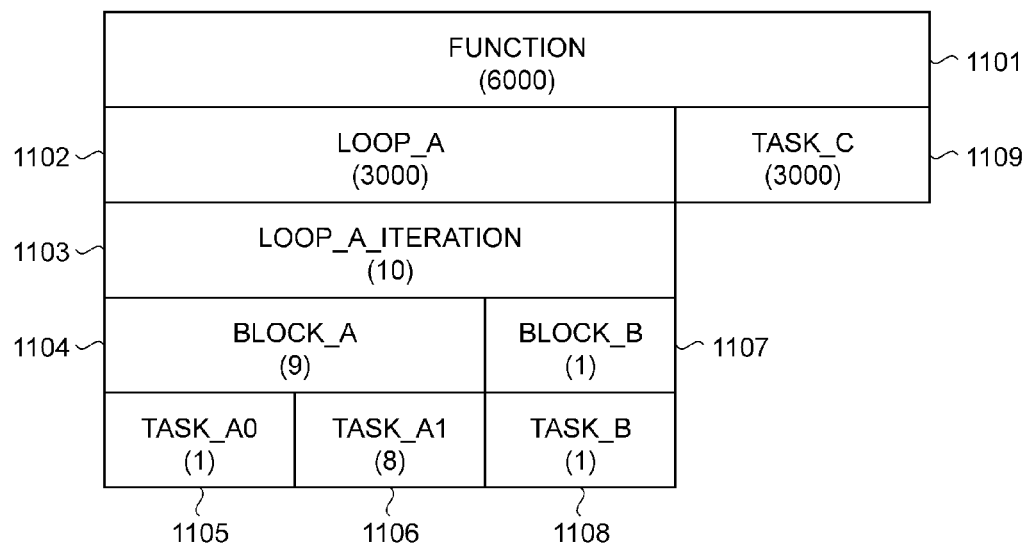
FIG. 11 is a diagram illustrating a generation example of display event unit information according to the first embodiment.

Referring to FIG. 11, a generation example of the display event unit information will be described. The display event unit information generation unit 107 calculates the section information on each of the program structures based on the event information. In this example, the section information on the program structure is calculated as minimum section information. FIG. 11 illustrates the program structures and the minimum section information thereof. Program structures 1101, 1102, 1103, 1104, 1105, 1106, 1107, 1108, and 1109 correspond to the program structure information 701, 702, 703, 704, 705, 706, 707, 708, and 709, respectively. Execution times in the minimum section information 1101 to 1109 are 6000 cycles, 3000 cycles, 10 cycles, 9 cycles, 1 cycle, 8 cycles, 1 cycle, 1 cycle, and 3000 cycles, respectively. The display event unit information generation unit 107 specifies the program structures 1101, 1102, and 1109 having the minimum section information satisfying the section "100" or more of the minimum drawing unit information in the time axis information, and specifies the program structures 1101, 1102, and 1109 in which all the program structure information having the same adjacent inclusive program structure information satisfies the section "100" or more of the minimum drawing unit information in the time axis information. Of the selected program structures 1101, 1102, and 1109, the display event unit information generation unit 107 sets as display event units the program structures 1102 and 1109 that are not in inclusive relationship and have the smallest minimum section information. Based on the program structure identification information in the program structure information indicative of the program structures, the display event unit information generation unit 107 generates display event unit information 1001 and 1002.

When the section in the minimum drawing unit information is section "9," for example, the display event unit information generation unit 107 specifies the program structures 1101, 1102, 1103, 1104, and 1109, and then specifies the program structures 1101, 1102, 1103, and 1109 having the minimum section information in which all the program structure information having the same adjacent inclusive program structure information satisfies the section "9" or more of the minimum drawing unit information in the time axis information. Of the selected program structures 1101, 1102, 1103, and 1109, the display event unit information generation unit 107 sets as display event units the program structures 1103 and 1109 that are not in an inclusion relationship and have the smallest minimum section information. Based on the program structure identification information in the program structure information indicative of the program structures, the display event unit information generation unit 107 generates display event unit information. In this case, the display event unit information 1001 illustrated in FIG. 10A has the program structure identification information "2."

The display event unit information described above may be generated for the event information within the drawing range based on the time axis drawing range in the time axis information 901 or may be generated for all the event information.

Display Event Information Storage Unit

The display event information storage unit 106 stores at least one piece of display event information. The display event information storage unit 106 may be a buffer, memory storage, or the like that is incorporated into an information processing device such as a PC (personal computer), may be a storage or the like connected to the information processing device, or may be a network storage or the like on a network.

The display event information includes section information, attribute information, density information, plural display event information, and statistical information. The plural display event information indicates whether the display event represents a plurality of events.

FIGS. 12A to 12C illustrate examples of display event information. In the embodiment, the section information is composed of execution starting information and execution ending information, the density information indicates the ratio between sections indicated by the display events and a section in which events are actually executed within the sections, and the statistical information indicates the event count. Display event information 1201 illustrated in FIG. 12A has execution starting information "0," execution ending information "3000," attribute information "BLOCK_A," density information "0.9," plural event display information "TRUE," and event count "600." Display event information illustrated in FIG. 12B has execution starting information "0," execution ending information "3000," attribute information "BLOCK_B," density information "0.1," plural event display information "TRUE," and event count "300." Display event information 1203 illustrated in FIG. 12C has execution starting information "3000," execution ending information "1," attribute information "TASK_C," density information "1," plural event display information "FALSE," and event count "1."

Display Event Information Generation Unit

The display event information generation unit 108 acquires the event information from the event information storage unit 102, program structure information from the program structure information storage unit 103, and display event unit information from the display event unit information storage unit 105, and then decides display events based on the program structure identification information in the display event unit information and the attribute information in the event information. The display event information generation unit 108 generates display event information including section information, attribute information, density information, plural event display information, and statistical information for each of display events. The attribute information in the display event information is decided based on the attribute information on an event included in the display events. The section information is decided based on the section information on an event included in the display events. The plural event display information is decided based on the event count included in the display events. The statistical information is decided based on the event information on an event included in the display events.

Generation of display event information will be described taking notice of the display event unit information 1001. First, based on the program structure identification information "1" and the program structure information in the display event unit information 1001, the display event information generation unit 108 specifies the program structure identification information "2", "3", "4", and "5" in the inclusive program structure information. Next, the display event information generation unit 108 selects the event information having the specified program structure identification information, and sets the unit of separation in the program structure information "LOOP_A" in the program structure identification information "1" as one display event for each of the attribute information in the event information. In the embodiment, the event information having the program structure information with the program structure identification information "1" indicates "TASK_A0" 206, "TASK_A1" 207, and "TASK_B" 208 in the program 201. Therefore, the display event information generation unit 108 separates all the event information corresponding to "TASK_A0" 206, "TASK_A1" 207, and "TASK_B" 208 in the "LOOP_A," and decides the section information based on the section information in all the event information. The section information in the "LOOP_A" has the section information in all the event information corresponding to "TASK_A0" 206, "TASK_A1" 207, and "TASK_B" 208, the execution starting time "0," and the execution ending time "3000."

Next, the display event information generation unit 108 generates one display event for each of the attribute information relative to the separated event information. For example, the display events with the attribute information "BLOCK_A" refer to all the events corresponding to "TASK_A0" 206 and "TASK_A1" 207. Thus, an example of generating the display event information 1201 with the attribute information "BLOCK_A" will be described. The section information on the display events with the attribute information "BLOCK_A" is the section information in the program structure "LOOP_A," the execution starting time is "0," the execution ending time is "3000," the attribute information in the display event information 1201 is "BLOCK_A," the statistical information is the event count "1200" indicated by the display events, the plural event display information is "TRUE," and the ratio between sections indicated by the display events and a section in which the events are actually executed within the sections is determined as "0.9" according to an equation "(1×300+8× 300)÷(3000)." The display event information generation unit 108 generates the display event information 1201 including the foregoing information.

The density information is calculated based on the events indicated by the display events and section information thereof. This information may be the ratio between sections indicated by the display events and a section in which the events are actually executed within the sections, may be the ratio between sections indicated by the display events and the sum of sections in which the events are executed within the sections, or may be the average value of sections in which the events are executed within the sections indicated by the display events.

The statistical information relates to events indicated by the display events. This information may be the event count indicated by the display events, information on a section in which the events are operated, or the sum of sections in which the events are operated, for example.

Object Generation Unit

The object generation unit 109 acquires display event information from the display event information storage unit 106 and axis information from the axis information storage unit 104, and then decides the display position and display size in the direction of the time axis based on the section information in the input display event information and the time axis information in the input axis information. The object generation unit 109 also decides the display position in the direction of the attribute axis based on the attribute information in the display event information and the attribute axis information in the axis information, and decides the display form based on the density information in the display event information, and decides an action to be taken in response to a user input based on the plural event display information in the display event information, and generates an event object indicative of an event.

Generation of an event object will be described taking notice of the display event information 1201. The object generation unit 109 first decides the display size and the display position in the direction of the time axis, based on the time axis information 901 in the axis information, the execution starting information "0," and the execution ending information "3000" in the display event information 1201. The object generation unit 109 also decides the display position in the direction of the attribute axis based on the attribute axis information 902 in the axis information, decides the display form based on the density information in the display event information 1201, and decides an action to be taken in response to the user input to the event object based on the plural event display information in the display event information 1201.

On decision of the display form, for example, the color of an event object may be decided based on the density information, or in the case where the plural event display information is "TRUE," the information such as the event count may be decided to be displayed in text format, or in the case where the plural event display information is not "FALSE," the section information may be decided to be displayed. The display form only needs to be decided based on the density information, and thus can be modified in any manner as far as the display form clarifies differences in the density information. The differences in the density information may be represented as gradation of color or brightness of color, for example.

The action to be taken in response to the user input only needs to be different between display events with different plural event display information. The differences in actions may be the presence or absence of display of the statistical information or the presence or absence of the actions themselves, for example.

Axis Object Generation Unit

The axis object generation unit 110 acquires axis information from the axis information storage unit 104 and generates a time axis object and an attribute axis object. The axis object generation unit 110 first generates a time axis object that indicates the time "100" per display interval of the display device and has the drawing range of "0" to "5000," based on the time axis information. Next, the axis object generation unit 110 generates an attribute axis object with the attribute axis name in the attribute axis information as a label arranged according to the display position information. For example, in the attribute axis information of "BLOCK_A," the axis object generation unit 110 generates the attribute axis object with the label "BLOCK_A" and the display position "100."

Display Unit

The display unit 111 acquires the axis object generated at the axis object generation unit 110, and draws the axis object on the screen based on the display information held in the axis object. The time axis object displays a time information label for each specific section and the attribute axis object displays an attribute label. The display unit 111 may acquire a display size such as a screen size or a window size. The display unit 111 may display the axis object of a displayable size or may display the axis object converted into a displayable size.

Figure 13:
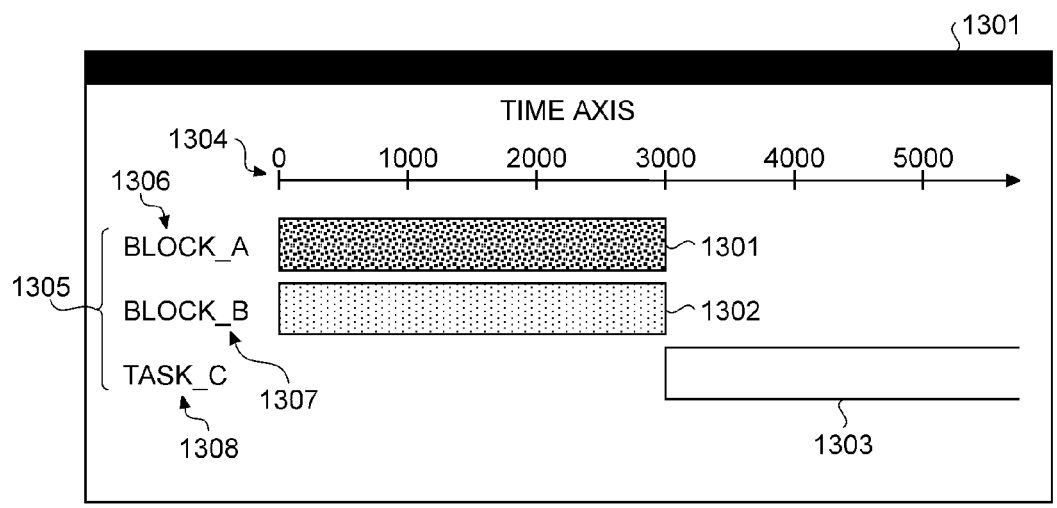
FIG. 13 is a diagram illustrating a display example of program execution status according to the first embodiment.

The display unit 111 also acquires the even object generated at the object generation unit 109, and draws the event object on the screen based on the display position information held in the event object. In the embodiment, as illustrated in FIG. 13, the display unit 111 displays event objects indicative of the display event information 1201, 1202, and 1203 in sequence as 1301, 1302, and 1303. In addition, the display unit 111 displays a time axis object as 1304, and an attribute axis object as 1305, and attribute axis labels as 1306, 1307, and 1308.

Figure 14:
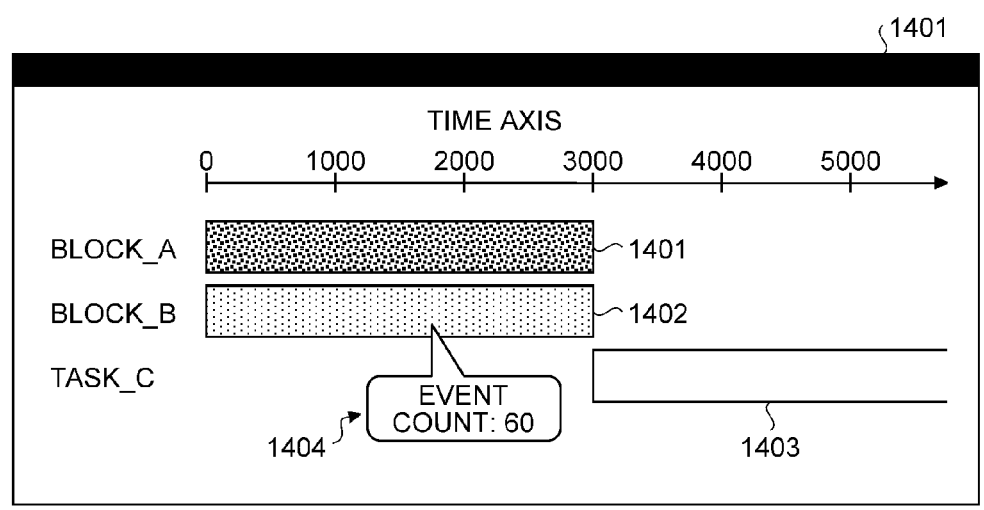
FIG. 14 is a diagram illustrating another display example of program execution status according to the first embodiment.

The display unit 111 also acquires input from the user using the input unit 112 and displays the action defined by the event object according to the user input. For example, as illustrated in FIG. 14, in the case where there is a user input such as mouseover on the event object 1402 of the display event information 1202, the display unit 111 displays "event count: 60" 1404 as statistical information, for example.

As described above, according to the embodiment, the events are collectively displayed according to the program structure, and it is thus possible to allow the user to easily comprehend the program execution status during execution of a large number of events.

In the embodiment, one time axis object is displayed on the time axis as an example, but the present invention is not limited to this. For example, a plurality of time axis objects indicative of different periods may be displayed on one screen and event objects of the attribute axis objects may be displayed relative to the time axis objects.

Second Embodiment

Next, a second embodiment will be described in detail with reference to the drawings. In the first embodiment, the program execution status is displayed according to the program structure. Meanwhile, in the second embodiment, a program information generation system, a method for program information generation, a program for program information generation, and a program information display system by which access to a memory address space during execution of the program is displayed according to a data structure, as exemplified below.

The program information display device (system) according to the embodiment may be configured in the same manner as the program information display device (system) 101 described above in relation to the first embodiment. However, the "event" in the first embodiment will be replaced with "access," and the "program structure" in the first embodiment will be replaced with "data structure." In addition, a memory address axis will be used as axis information, instead of time axis.

FIG. 15 illustrates an example of a program executed by the program information display device (system) 101 according to the second embodiment. As illustrated in FIG. 15, a program 1501 is configured to access, in memory address spaces in memory address space representations A[0] [0] to A[9] [9], partial memory address spaces in memory address space representations A[0] [0] to A[0] [9] by "ACCESS(A[0] [i])" of a loop 1502, and partial memory address spaces in memory address space representations A[1] [0] to A[1] [4] by "ACCESS(A[1] [i])" of a loop 1503. The memory address space representations only need to represent memory address spaces in a description of a program. For example, the memory address space representations may be variables, arrays, or structures in C language, for example.

Figure 16:
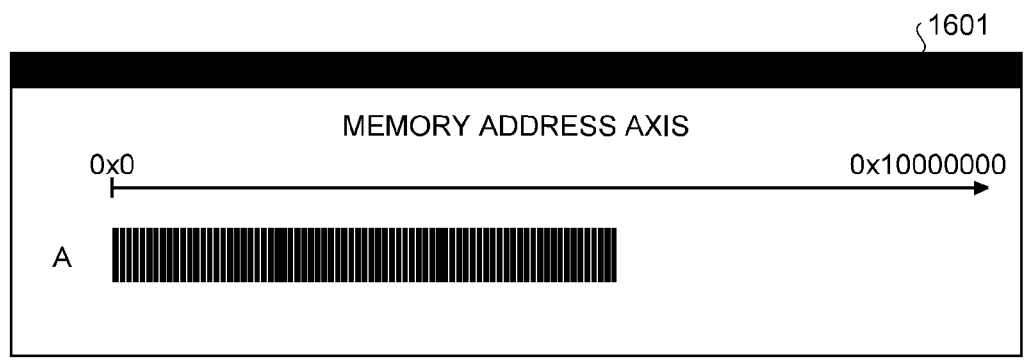
FIG. 16 is a diagram illustrating a display example of program execution status according to a conventional technique.
Figure 17:
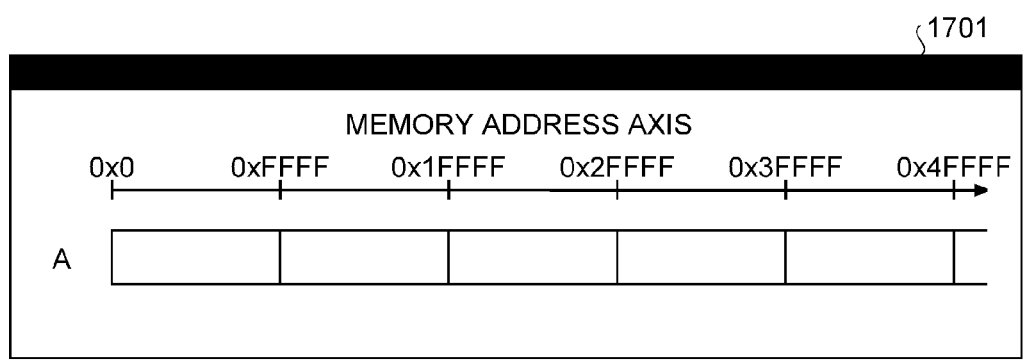
FIG. 17 is a diagram illustrating another display example of program execution status according to a conventional technique.

In the case of displaying on the display device the status of access to the memory address spaces during execution of the program 1501 as described above, when an attempt is made to display all the memory address spaces on one screen or in one window, there may arise a situation in which the accesses cannot be distinguished one by one depending to the drawing performance of the display device as illustrated in FIG. 16. Meanwhile, in the case of displaying part of the memory address space on one screen or in one window, there may arise a situation in which all elements of the memory address axis cannot be displayed at once as illustrated in FIG. 17. In such a situation, the displayed range can be scrolled through with the scroll bar or the like to view the range not displayed. However, the status of access to the entire memory address space cannot be overviewed and it is thus difficult for the user to comprehend the entire access status.

In the embodiment, the access not displayed due to the limited drawing performance is collectively displayed according to the hierarchy of the data structure, and information on the access not displayed due to the limited drawing performance is displayed, thereby allowing the user to comprehend the entire access status even when the same is collectively displayed. In the embodiment, as in the first embodiment, the density information is used as information on the access not displayed due to the limited drawing performance.

Overall operations of the program information display device (system) according to the second embodiment may be the same as those described above with reference to FIG. 6 in relation to the first embodiment. However, the "event" in the first embodiment will be replaced with "access," and the "program structure" in the first embodiment will be replaced with "data structure."

Next, in the embodiment, information stored in or generated by components of the program execution state device (system) will be described below in detail with reference to the drawings.

Data Structure Information

FIGS. 18A to 18C illustrate examples of data structure information in memory address spaces accessed in the program 1501 exemplified in FIG. 15. The data structure information is a replacement for the program structure information exemplified in FIGS. 7A to 7I in relation to the first embodiment.

Data structure information 1801 in the memory address space as an access destination in memory address space representation A[ ] [ ] illustrated in FIG. 18A has data structure identification information "A[ ] [ ]," data hierarchy information "A[ ] [ ]," and inclusive data structure identification information "NONE," which forms a hierarchical structure indicative of the entire memory address space. Therefore, the data structure information 1801 has no inclusive data structure information.

Data structure information 1802 in the partial memory address space as an access destination in memory address space representation A[0] [ ] illustrated in FIG. 18B has data structure identification information "A[0] [ ]," data hierarchy information "A[0] [ ]," and inclusive data structure identification information "A[ ] [ ]" The data structure information 1802 is given the inclusive data structure identification information "A[ ] [ ]" indicating that the data structure information 1802 is included in the data structure information 1801 in the memory address space representation A[ ] [ ].

Similarly, data structure information 1803 in the partial memory address space as an access destination in memory address space representation A[1] [ ] illustrated in FIG. 18C has data structure identification information "A[1] [ ]," data hierarchy information "A[1] [ ]," and inclusive data structure identification information "A[ ] [ ]." The data structure information 1803 is given the inclusive data structure identification information "A[ ] [ ]" indicating that the data structure information 1803 is included in the data structure information 1801 in the memory address space representation A[ ] [ ].

Data structure information 1811 to 1820 in the partial memory address spaces as access destinations in memory address space representations A[0] [0] to A[0] [9] illustrated in FIG. 18D have data structure identification information "A[0] [0]" to "A[0] [9]" and data hierarchy information "A[0] [0]" to "A[0] [9]," respectively, and has in common inclusive data structure identification information "A[0] [ ]." The pieces of the data structure information 1811 to 1820 are given the inclusive data structure identification information "A[0] [ ]" indicating that the pieces of the data structure information 1811 to 1820 are included in the data structure information 1802 in the memory address space representation A[0] [ ].

Similarly, data structure information 1821 to 1830 in the partial memory address spaces as access destinations in memory address representations A[1] [0] to A[1] [9] illustrated in FIG. 18E have data structure identification information "A[1] [0]" to "A[1] [9]" and data hierarchy information "A[1] [0]" to "A[1] [9]," respectively, and have in common inclusive data structure identification information "A[1] [ ]." The pieces of the data structure information 1821 to 1830 are given the inclusive data structure identification information "A[1] [ ]" indicating that the pieces of the data structure information 1821 to 1830 are included in the data structure information 1803 in the memory address space representation A[1] [ ].

Access Information

FIGS. 19A and 19B illustrate examples of access information on accesses occurring by execution of the program 1501 exemplified in FIG. 15. The access information is a replacement for the event information exemplified in FIGS. 8A to 8D in relation to the first embodiment.

FIG. 19A illustrates access information 1901 to 1910 on accesses occurring during execution of the loop 1502 in the program 1501 illustrated in FIG. 15. For example, the access information 1901 indicates execution of first iteration of the loop 1502 (when i=0), with starting point memory address information "0x00000000," ending point memory address information "0x0000FFFF," data structure identification information "A[0] [0]," and access count "1." The access information 1909 indicates execution of tenth iteration of the loop 1502 (when i=9), with starting point memory address information "0x0009FFFF," ending point memory address information "0x000AFFFF," data structure identification information "A[0] [9]," and access count "1."

FIG. 19B illustrates access information 1911 to 1915 on accesses occurring during execution of the loop 1503 in the program 1501 of FIG. 15. For example, the access information 1911 indicates execution of first iteration of the loop 1503 (when i=0), with starting point memory address information "0x00F00000," ending point memory address information "0x00F0FFFF," data structure identification information "A[1] [0]," and access count "1." The access information 1919 indicates execution of fifth iteration of the loop 1503 (when i=4), with starting point memory address information "0x00F9FFFF," ending point memory address information "0x00FAFFFF," data structure identification information "A[1] [9]," and access count "1."

Axis Information

Figure 20:
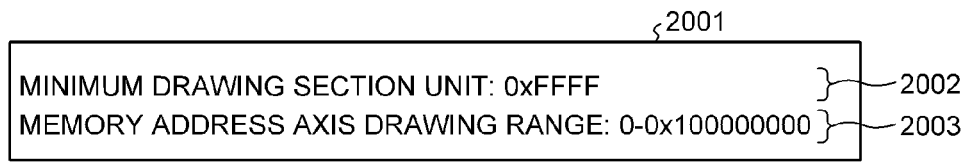
FIG. 20 is a diagram illustrating an example of axis information according to the second embodiment.

FIG. 20 illustrates an example of axis information according to the embodiment. As illustrated in FIG. 20, axis information 2001 according to the embodiment has minimum drawing section unit information 2002 as "0xFFFF" and memory address axis drawing range information 2003 as "0-0x100000000." This means that the minimum drawing unit indicates memory address space width 0xFFFF and the display range covers from memory address 0 to memory address 0x100000000 in the memory address space.

Display Access Unit Information

Figure 21A:
FIG. 21A is a diagram illustrating an example of display access unit information according to the second embodiment (first)
Figure 21B:
FIG. 21B is a diagram illustrating an example of display access unit information according to the second embodiment (second)

FIGS. 21A and 21B illustrate examples of display access unit information according to the embodiment. The display access unit information is a replacement for the display event unit information exemplified in FIGS. 10A to 10C in relation to the first embodiment. Display access unit information 2101 illustrated in FIG. 21A has data structure identification information "A[0] [ ]." Display access unit information 2102 illustrated in FIG. 21B has data structure identification information "A[1] [ ]."

Figure 22:
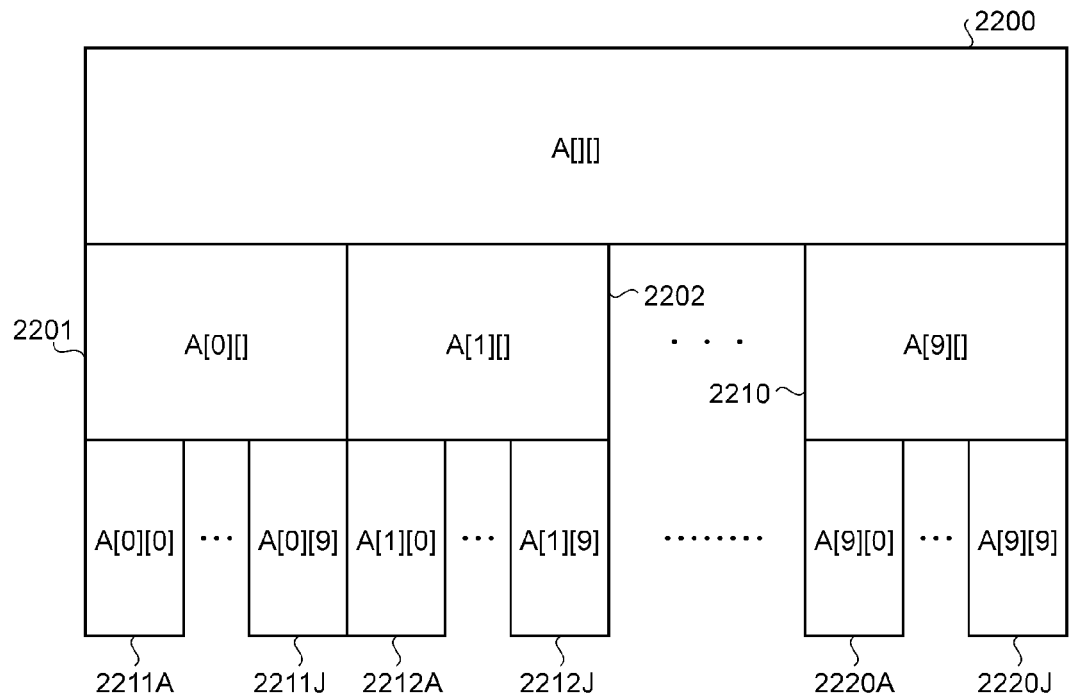
FIG. 22 is a diagram illustrating a generation example of display access unit information according to the second embodiment.

Referring to FIG. 22, a generation example of display access unit information will be described. At generation of display access unit information, section information in each data structure is calculated based on access information. In this example, the section information in the data structure is calculated as minimum section information. FIG. 22 illustrates data structures and minimum section information thereof. Of data structures 2200, 2201, 2202, . . . 2210, 2211A to 2211J, 2212A to 2212J, . . . , and 2220A to 2220J, the data structures 2200, 2201, and 2202 correspond to the data structure information 1801, 1802, and 1803, respectively, and the data structures 2211A to 2211J and 2212A to 2212J correspond to the data structure information 1811 to 1820 and 1821 to 1830, respectively.

On generation of display access unit information, the data structures 2200, and 2201 to 2210 are specified having minimum section information satisfying the section "0xFFFF" or larger of the minimum drawing section unit information 2002 in the memory address axis information. Then, the data structures 2200, and 2201 to 2210 are specified in which all data structure information with the same adjacent inclusive data structure information have minimum section information satisfying the section "0xFFFF" or larger of the minimum drawing section unit information in the memory address axis information. Of the selected data structures 2200, and 2201 to 2210, the data structures 2201 and 2202 that are not in an inclusion relationship, have the smallest minimum section information, and are accessed by execution of the program 1501, are set as display access units. Based on the data structure identification information in the data structure information indicative of the data structures 2201 and 2202, the display access unit information 2101 and 2102 are generated.

Display Access Information

FIGS. 23A and 23B illustrate examples of display access information according to the embodiment. The display access information is a replacement for the display event information exemplified in FIGS. 12A to 12C in relation to the first embodiment.

In the embodiment, the section information is composed of the starting point memory address information and the ending point memory address information, and the density information is the ratio between sections indicated by display accesses and a section in which access is actually made within the sections, and the statistical information is the number of elements accessed. Display access information 2301 illustrated in FIG. 23A has starting point memory address information "0x00000000," ending point memory address information "0x000AFFFF," attribute information "A[0] [ ]," density information "1.0," plural access display information "TRUE," and element count "10." Display access information 2302 illustrated in FIG. 23B has starting point memory address information "0x00F00000," ending point memory address information "0x00FAFFFF," attribute information "A[1] [ ]," density information "0.5," plural access display information "TRUE," and element count "5."

In the embodiment, the object generation unit 109 acquires inputs of display access information from a display access information storage unit (equivalent to the display event information storage unit 106) and axis information from the axis information storage unit 104, and then decides the display position and the display size in the direction of the memory address axis, based on the section information in the input display access information and the memory address axis information in the axis information. The object generation unit 109 also decides the display form based on the density information in the display access information, decides an action to be taken in response to the user input based on the plural access display information in the display access information, and generates an access object indicative of an access (equivalent to the event object).

In the embodiment, the density information is the ratio between the sections indicated by display accesses and a section in which access is actually made within the sections, but the density information is not limited to this. For example, the density information may be modified in various manners such that the density information is formed by adding the element count used as the statistical information to the ratio between the sections indicated by the display accesses and a section in which access is actually made within the sections.

In the embodiment, no attribute axis is used as the axis information. For example, in the case where one and the same memory address space is accessed by a plurality of processors such as a multi-core processor, for example, an attribute axis may be used to separate the accesses by the processors and display the same in the separated state as in the first embodiment.

The display unit 111 acquires the axis object generated at the axis object generation unit 110 and draws the axis object on the screen based on the display information held in the axis object, as in the first embodiment. At that time, in the case of using a multi-core processor, an attribute label may be displayed as the attribute axis object.

Figure 24:
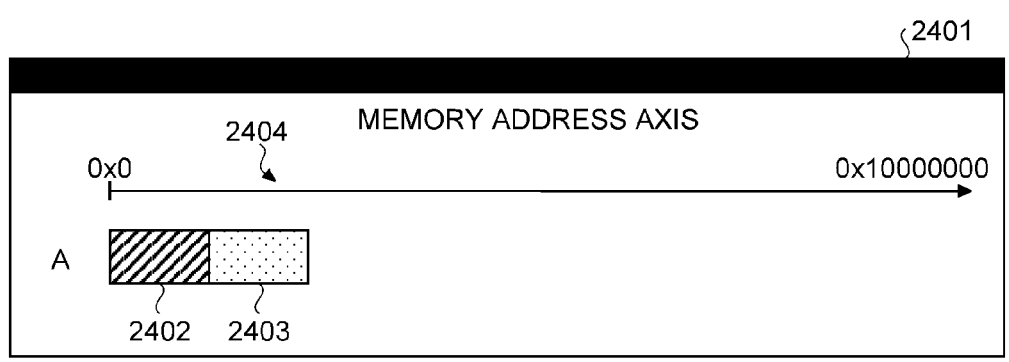
FIG. 24 is a diagram illustrating another display example of program execution status according to the second embodiment.

The display unit 111 acquires the access object generated at the object generation unit 109 and draws the access object on the screen based on the display position information held in the access object. In the embodiment, as illustrated in FIG. 24, the display unit 111 displays access objects indicative of the display access information 2301 and 2302 in sequence as 2402 and 2403. In addition, the display unit 111 displays a memory access axis object 2404. As in the first embodiment, the display unit 111 may acquire input from the user using the input unit 112 and display an action defined by the event object according to the user input.

Figure 25:
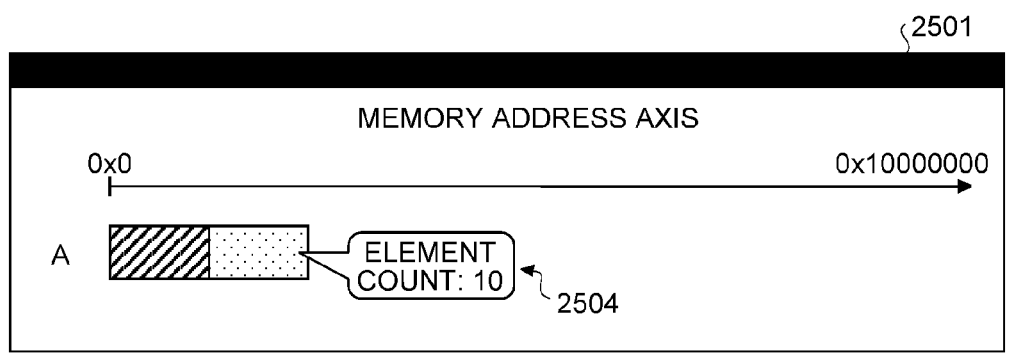
FIG. 25 is a diagram illustrating another display example of program execution status according to the second embodiment.

As in the first embodiment, the display unit 111 acquires input from the user using the input unit 112 and displays an action defined by the access object according to the user input. As illustrated in FIG. 25, for example, in the case where there is user input such as mouseover on the event object 2402 in the display access information 2301, the display unit 111 displays "element count: 10" 2504 as statistical information, for example.

As described above, according to the embodiment, accesses to the memory address spaces during execution of the program are displayed according to the data structure, and it is thus possible to allow the user to easily comprehend the program execution status with occurrence of a large number of accesses.

In the foregoing description, the embodiment is premised on an instruction for access to the minimum unit in the data structure as in the memory address space representation A[0][0], but the embodiment is not limited to this. The embodiment can also be applied to an instruction for access to a medium-scale unit as in the memory address space representation A[0] [ ], such as "memset" in C language, for example.

In the foregoing embodiment, one attribute axis is set in one memory address space, but the embodiment is not limited to this. For example, in the foregoing embodiment, the access to the medium-scale unit by the variable A[0] [ ] and the access to the medium-scale unit by the memory address space representation A[1] [ ] may be set as separate attribute axes. In that case, a memory address axis may be set for each of the attribute axes.

Further, in the foregoing embodiment, accesses to the memory address spaces are collectively displayed according to the data structure, but the embodiment is not limited to this. For example, the embodiment can be configured such that accesses are collectively displayed according to the program structure (data access instruction).

In addition, the above-described units constituting the program information display device (system) according to each of the embodiments can be realized using one or more data processing devices such as CPUs (central processing unit) and/or one or more memories.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A program information generation system configured to generate one or more event objects representing two or more events occurring by execution of a program, the program information generation system comprising:
   an axis object processor that acquires axis information about a coordinate system for representing an execution status of the program, and generates an axis object representing the coordinate system based on the axis information;
   a display event information processor that acquires event information related to each of the two or more events and program structure information related to a section of the program causing the two or more events to occur, and generates display event information related to one or more display events representing the two or more events;
   a display event unit information processor that generates display event unit information; and
   an object generation processor that generates the one or more event objects based on the display event information indicating a display of the one or more display events, wherein:
   the axis information comprises display range information of a continuous axis related to section information in the event information;
   the event information comprises the section information and program structure identification information;
   the display event unit information comprises the program structure identification information in the event information related to the one or more display events;
   the display event unit information is related to each of the one or more display events representing the event information;
   each of the program structure information comprises the program structure identification information for identifying each of the program structure information, program hierarchy information, and inclusive program structure identification information for specifying the program structure information in an inclusive relationship with each of the program structure information;
   the display event information comprises the section information of an event related to the display event information;
   the display event information processor generates the display event information based on the event information, the display event unit information, and the program structure information; and
   the object generation processor determines a display position of an event object indicative of the one or more display events based on the section information in the display event information and the axis information.

2. The program information generation system according to claim 1,
wherein:
   the axis information further comprises minimum drawing section information indicative of a drawing minimum unit of a section represented by the continuous axis;
   the display event unit information further comprises the program structure information comprising a section equal to or larger than the section of the drawing minimum unit of the minimum drawing section information in the axis information; and
   the display event unit information processor acquires the event information, the program structure information, and the minimum drawing section information of the continuous axis, and generates the display event unit information based on the minimum drawing section information, the event information, and the program structure information.

3. The program information generation system according to claim 2, wherein:
   the display event information further comprises density information;
   the display event information processor generates the density information based on section information of one or more events related to one or more pieces of the program structure information specified based on the program structure identification information in the display event unit information and the section information in the display event information; and the object generation processor determines a display form of the event object based on the density information.

4. The program information generation system according to claim 3, wherein:
in the display event unit information, the program structure information indicated by the program structure identification information in a first display event unit information comprises no inclusive relationship with the program structure information indicated by the program structure identification information in a second display event unit information; and
the display event unit information processor does not set as the display event unit information, the program structure information comprising an inclusive relationship with the program structure information indicated by the program structure identification information in the first display event unit information or the second display event unit information.

5. The program information generation system according to claim 3, wherein:
the display event information comprises plural event related display information indicating whether the one or more display events relate to a plurality of events;
the display event information processor determines whether there exists a plurality of pieces of the event information related to the program structure information indicated by the program structure identification information in the display event unit information, and generates the plural event related display information based on a result of the determination; and
the object generation processor generates an event object comprising an action in response to a user input of a user interface, based on the plural event related display information in the display event information.

6. The program information generation system according to claim 5, further comprising a display unit that displays the axis object and the one or more event objects, wherein:
the display unit comprises a user interface that executes the action of the event object in response to the user input of the user interface.

7. The program information generation system according to claim 1, wherein:
each of the two or more events is a unit of execution of the program; and
the continuous axis is a time axis in execution of the program.

8. The program information generation system according to claim 1, wherein:
each of the two or more events is an access to a memory address space; and
the continuous axis is a memory address axis representing the memory address space.

9. The program information generation system according to claim 1, further comprising a display unit that displays the axis object and the one or more event objects.

10. A program information generation method for generating one or more event objects representing two or more events occurring by execution of a program, the program information generation method comprising:
based on axis information in a coordinate system drawing an execution status of the program information generation program, generating, by an axis object processor, an axis object representing the coordinate system;
based on event information related to each of the two or more events and program structure information related to a section of the program information generation program causing the two or more events to occur, generating, by a display event information processor, display event information related to one or more display events representing the two or more events;
generating, by a display event unit information processor, display event unit information; and
generating, by an object generation processor, the one or more event objects based on the display event information indicating a display of the one or more display events, wherein:
the axis information comprises display range information of a continuous axis related to section information in the event information;
the event information comprises the section information and program structure identification information;
the display event unit information comprises the program structure identification information in the event information related to the one or more display events;
the display event unit information is related to each of the one or more display events representing the event information;
each of the program structure information comprises the program structure identification information for identifying each of the program structure information, program hierarchy information, and inclusive program structure identification information for specifying the program structure information in an inclusive relationship with each of the program structure information;
the display event information comprises the section information of an event related to the display event information;
the display event information processor generates the display event information based on the event information, the display event unit information, and the program structure information; and
the object generation processor determines a display position of an event object indicative of the one or more display events based on the section information in the display event information and the axis information.

11. A computer program product having a non-transitory computer readable medium storing programmed instructions for a program information generation program for operating a computer configured to generate one or more event objects representing two or more events occurring by execution of the program information generation program, the program information generation program causing the computer to perform the steps of:
based on axis information in a coordinate system drawing an execution status of the program information generation program, generating, by an axis object processor, an axis object representing the coordinate system;
based on event information related to each of the two or more events and program structure information related to a section of the program information generation program causing the two or more events to occur, generating, by a display event information processor, display event information related to one or more display events representing the two or more events;
generating, by a display event unit information processor, display event unit information; and
generating, by an object generation processor, the one or more event objects based on the display event information indicating a display of the one or more display events, wherein:
the axis information comprises display range information of a continuous axis related to section information in the event information;

the event information comprises the section information and program structure identification information;

the display event unit information comprises the program structure identification information in the event information related to the one or more display events;

the display event unit information is related to each of the one or more display events representing the event information;

each of the program structure information comprises the program structure identification information for identifying each of the program structure information, program hierarchy information, and inclusive program structure identification information for specifying the program structure information in an inclusive relationship with each of the program structure information;

the display event information comprises the section information of an event related to the display event information;

the display event information processor generates the display event information based on the event information, the display event unit information, and the program structure information; and the object generation processor determines a display position of an event object indicative of the one or more display events based on the section information in the display event information and the axis information.

* * * * *